US008654651B2

(12) United States Patent
Leong et al.

(10) Patent No.: US 8,654,651 B2
(45) Date of Patent: Feb. 18, 2014

(54) PACKET SWITCH APPLIANCE WITH A PACKET SWITCHING AND PACKET PROCESSING DAUGHTER BOARD

(75) Inventors: Patrick Pak Tak Leong, Palo Alto, CA (US); Thomas Kwoh Yin Cheung, Fremont, CA (US); King L. Won, San Jose, CA (US); Ted C. Ho, San Jose, CA (US)

(73) Assignee: Gigamon Inc., Milpitas, CA (US)

( * ) Notice: Subject to any disclaimer, the term of this patent is extended or adjusted under 35 U.S.C. 154(b) by 249 days.

(21) Appl. No.: 12/944,280

(22) Filed: Nov. 11, 2010

(65) Prior Publication Data

US 2011/0058566 A1 Mar. 10, 2011

Related U.S. Application Data (63) Continuation of application No. 11/796,001, filed on Apr. 25, 2007, now Pat. No. 7,848,326.

(51) Int. Cl.
*H04L 12/26* (2006.01)
*H04L 12/56* (2011.01)

(52) U.S. Cl.
USPC .......................... 370/241; 370/400; 710/301

(58) Field of Classification Search
None
See application file for complete search history.

(56) References Cited

U.S. PATENT DOCUMENTS

| 7,424,018 | B2 | 9/2008 | Gallatin et al. |
| 7,436,832 | B2 | 10/2008 | Gallatin et al. |
| 7,440,467 | B2 | 10/2008 | Gallatin et al. |
| 7,460,534 | B1 | 12/2008 | Bellenger |
| 7,543,208 | B2 | 6/2009 | Jun et al. |
| 7,616,646 | B1 | 11/2009 | Ma et al. |
| 7,835,358 | B2 | 11/2010 | Gallatin et al. |
| 2005/0190695 | A1 | 9/2005 | Phaal |
| 2005/0202847 | A1 | 9/2005 | Yu et al. |
| 2006/0146808 | A1* | 7/2006 | Campini et al. ............... 370/360 |
| 2007/0254654 | A1* | 11/2007 | Kanagala et al. .......... 455/435.1 |
| 2009/0135835 | A1 | 5/2009 | Gallatin et al. |
| 2009/0262745 | A1 | 10/2009 | Leong et al. |
| 2010/0091676 | A1* | 4/2010 | Moran et al. .................. 370/252 |
| 2012/0218901 | A1* | 8/2012 | Jungck et al. ................. 370/241 |

OTHER PUBLICATIONS

Non-final Office Action dated Dec. 3, 2009 for U.S. Appl. No. 11/796,001.
Final Office Action dated Jun. 2, 2010 for U.S. Appl. No. 11/796,001.
Notice of Allowance and Fees Due dated Sep. 10, 2010 for U.S. Appl. No. 11/796,001.

* cited by examiner

*Primary Examiner* — Min Jung
(74) *Attorney, Agent, or Firm* — Vista IP Law Group, LLP (57) ABSTRACT

A packet switch appliance for connection to a packet switching network, the packet switch appliance has a motherboard that includes a processor, a network switch chip, and a connector. The packet switch appliance also includes a daughter board configured to be removably connected to the motherboard through the connector. The daughter board may include one or more of a network switch chip and a processor unit.

48 Claims, 7 Drawing Sheets

PACKET SWITCH APPLIANCE WITH A PACKET SWITCHING AND PACKET PROCESSING DAUGHTER BOARD

RELATED APPLICATION DATA

This application is a continuation of U.S. patent application Ser. No. 11/796,001, filed on Apr. 25, 2007, now U.S. Pat. No. 7,848,326, the entire disclosure of which is expressly incorporated by reference herein.

BACKGROUND

1. Field

The present application relates generally to network switches and, more specifically, to a packet switching appliance with a packet switching daughter board.

2. Related Art

In a packet-switching network, the transmission, routing, forwarding, and the like of messages between the terminals in the packet-switching network are broken into one or more packets. Typically, data packets transmitted or routed through the packet switching network comprise three elements: a header, a payload, and a trailer. The header may comprise several identifiers such as source and destination terminal addresses, VLAN tag, packet size, packet protocol, and the like. The payload is the core data for delivery, other than header or trailer, which is being transmitted. The trailer typically identifies the end of the packet and may comprise error checking information. Data packets may conform to a number of packet formats such as IEEE 802.1D or 802.1Q.

Associated with each terminal in the packet-switching network is a unique terminal address. Each of the packets of a message has a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destination terminal. One skilled in the art commonly refers to the source terminal address and the destination terminal address as the source address and the destination address, respectively.

Packet switch appliances can be used to forward packets in the packet-switching network, based on their address information, to their destination terminals. Typically, packet switch appliances have one or more network ports for connection to the packet-switching network. The network port of a packet switch appliance can include a filter, which either drops or forwards packets. Packet switch appliances may also have one or more instrument ports connected to one or more network instruments, typically used to monitor packet traffic, such as packet sniffers, intrusion detection systems, intrusion prevention systems, or forensic recorders.

The packet switching demands of networks may vary greatly depending on the size and complexity of the network and the amount of packet traffic. Users may also desire expanded packet handling and processing functionality beyond basic switching, routing, and filtering. Users may also wish to deploy various network instruments for monitoring packet traffic.

SUMMARY

In one exemplary embodiment, a packet switching appliance is connected to a packet-switching network and one or more network instruments. The packet switching appliance has a motherboard that includes a processor, a first network switch chip, and a connector. The packet switching appliance also includes a daughter board which is removably connected to the motherboard through the connector. The daughter board includes a second network switch chip having a plurality of ports.

DESCRIPTION OF DRAWING FIGURES

Features and advantages of the present application will become apparent from the following detailed description, when it is considered in conjunction with the accompanying drawings figures.

DETAILED DESCRIPTION

The following description sets forth numerous exemplary configurations, parameters, and the like. It should be recognized, however, that such description is not intended as a limitation on the scope of the present invention, but is instead provided as a description of exemplary embodiments.

A. Network Configuration

Figure 1:
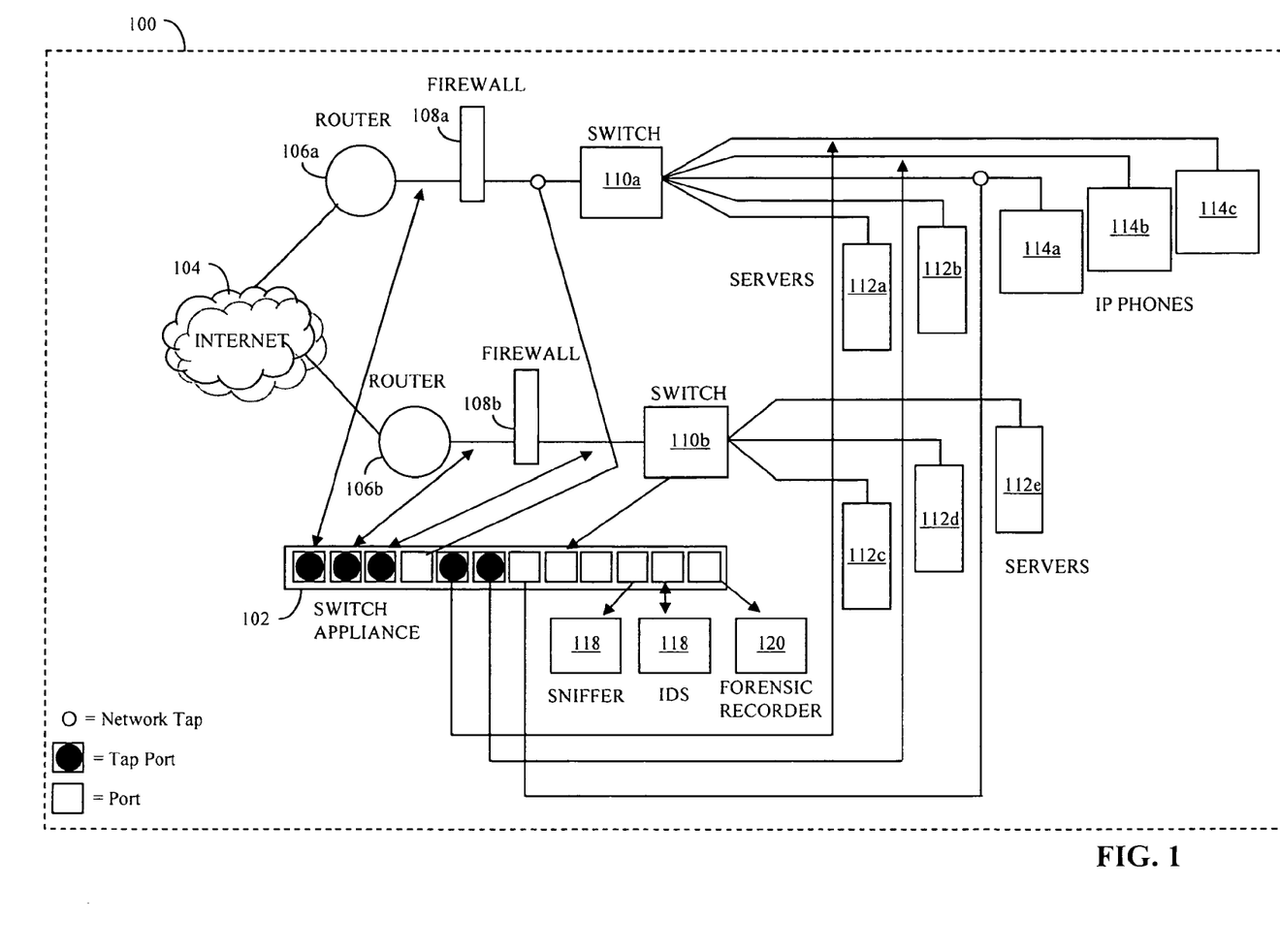
FIG. 1 illustrates an exemplary packet switching network and a packet switch appliance.

With reference to FIG. 1, in one exemplary embodiment, a packet switch appliance 102 is integrated into a packet switching network 100. The internet 104 is connected via routers 106a and 106b and firewalls 108a and 108b to switches 110a and 110b. Switch 110a is also connected to servers 112a and 112b and to IP phones 114a-c. Switch 110b is also connected to servers 112c-e. Packet switch appliance 102 is connected to various points of the network via network taps and tap ports on the packet switch appliance. Packet switch appliance 102 is also connected to a variety of network instruments for monitoring network-wide packet traffic: packet sniffer 116, intrusion detection system 118, and forensic recorder 120. In alternate embodiments, a packet switching network may comprise fewer components or more components, than those depicted, and the connection of the packet switch appliance to the network may be varied.

In the embodiment of FIG. 1, because packet switch appliance 102 is connected to every device in the packet-switching network, the packet switch appliance has a global network footprint and may potential access all data packets transmitted across the network. Consequently, network instruments, e.g., packet sniffer 116, intrusion detection system 118, and forensic recorder 120, which are connected to packet switch appliance 102, can potentially access information anywhere throughout the packet-switching network.

A user of network 100, such as a network administrator, may wish to configure packet switch appliance 102 to perform a range of packet handling, distribution, or processing functionalities.

Packet switch appliance 102 may be configured to perform a number of packet distribution and handling functions such as one-to-one, one-to-many, many-to-one, and many-to-many port distributing, filtering, flow-based streaming, and load balancing. For a more detailed description of these features, see U.S. patent application Ser. Nos. 11/123,273; 11/123,377; 11/123,465; and 11/123,729, all of which were filed on May 5, 2005, and which are all incorporated herein by reference, in their entireties. Packet switch appliance 102 may also perform packet modifications functions such as packet slicing and packet regeneration based on header, payload, trailer, or other packet information.

Packet switch appliance 102 may also be configured to perform packet processing functions such as packet modification. Packet modification may include, but is not limited to, additions or deletions to components of a packet, such as packet slicing or packet time stamping. Packet copying, packet regeneration, and packet flow control are additional examples of packet processing.

Due to its global footprint, the packet switch appliance 102 of FIG. 1 may potentially distribute, handle, or process data packets with a greater efficiency than may be realized by an appliance, instrument, or tool with less than a global footprint. Consequently, greater network or hardware efficiency, reduced bandwidth consumption, and/or increased performance may potentially be realized. Packet switch appliance 102 may find use as a network visibility system in conjunction with network instruments for packet traffic monitoring such as packet sniffers, intrusion detection systems, intrusion prevention systems, forensic recorders, and the like. Further, packet switch appliance 102 may be used as an in-data path content processing engine to further increase network and bandwidth efficiency over existing packet switch appliances by modifying, copying, and/or flow controlling packets in addition to packet switching.

However, a given user may only require a subset of the potential functionalities of the packet switch appliance. Accordingly, it is beneficial and efficient for the packet switch appliance to be configured with scaleable capacity and functionality ranging from basic packet handling and distribution to packet processing.

B. Packet Switch Appliance Mother Board

Figure 2:
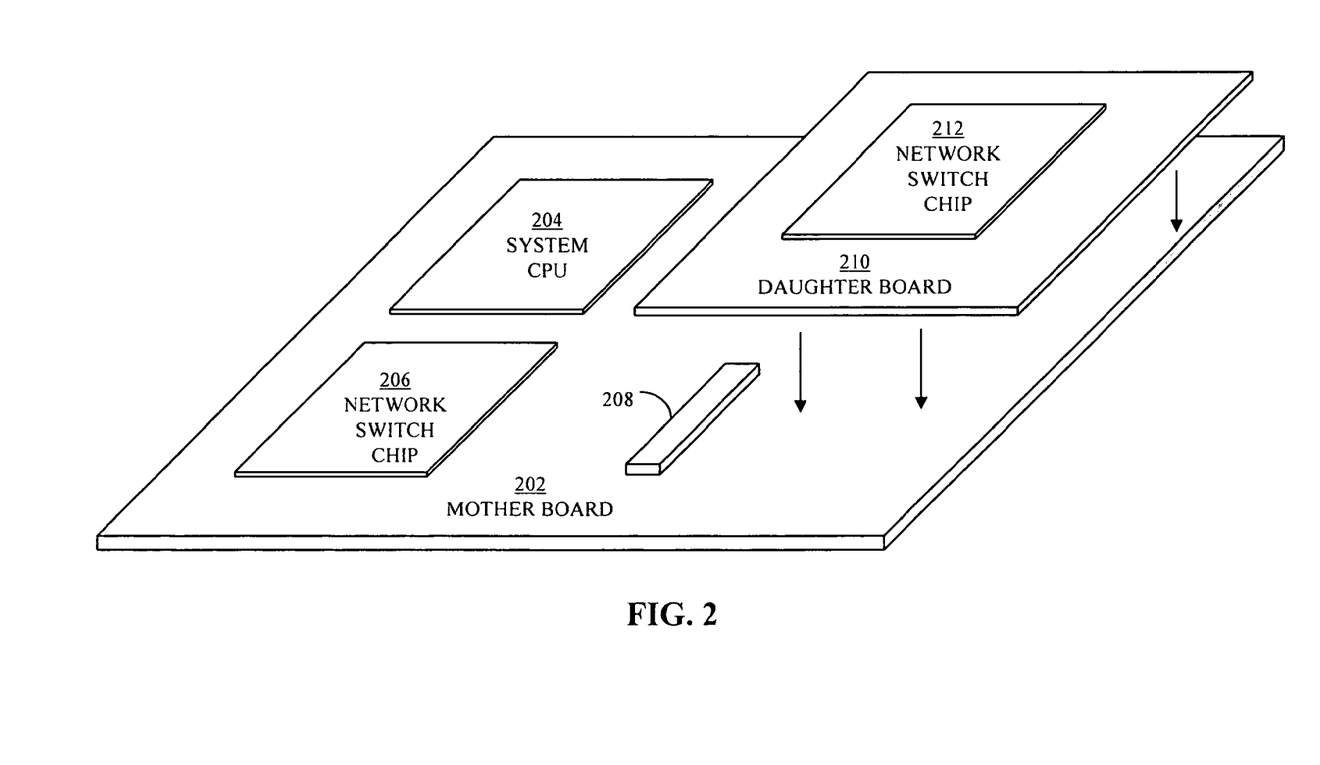
FIG. 2 illustrates an exemplary mother board and daughter board having a network switch of a packet switch appliance.
Figure 4:
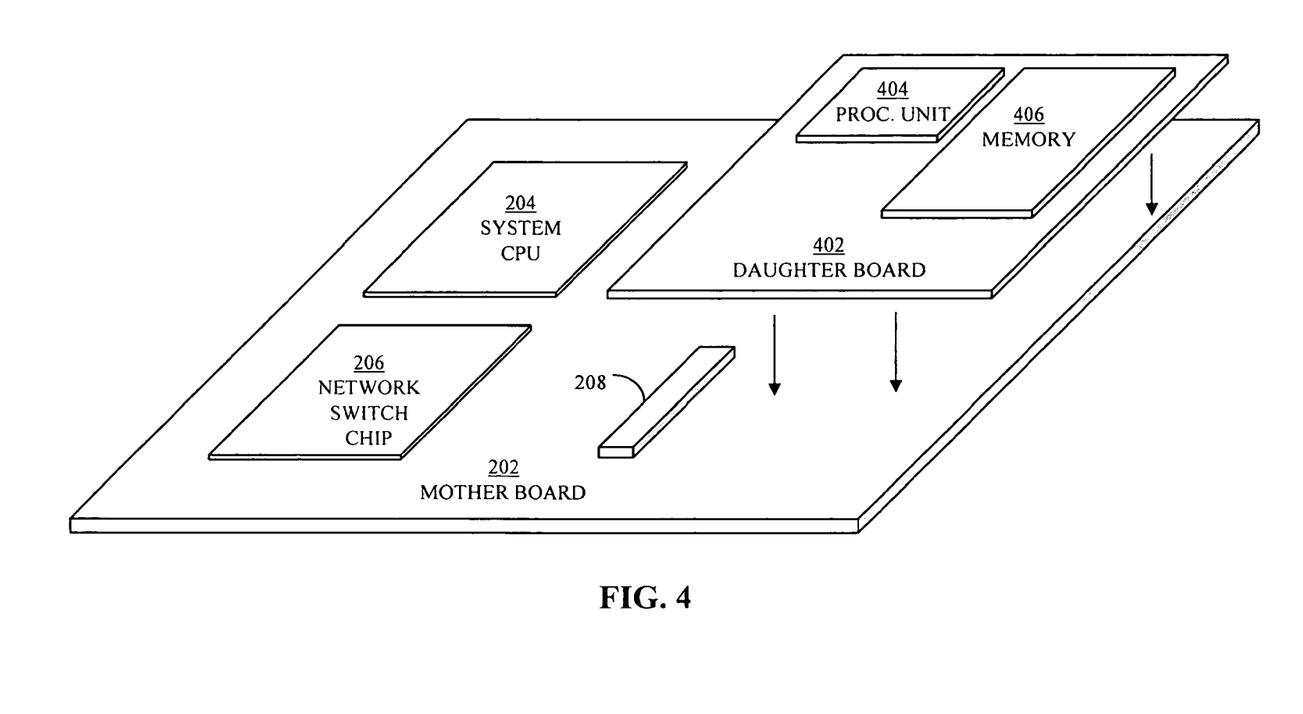
FIG. 4 illustrates an exemplary mother board and daughter board having a processor unit of a packet switch appliance.
Figure 6:
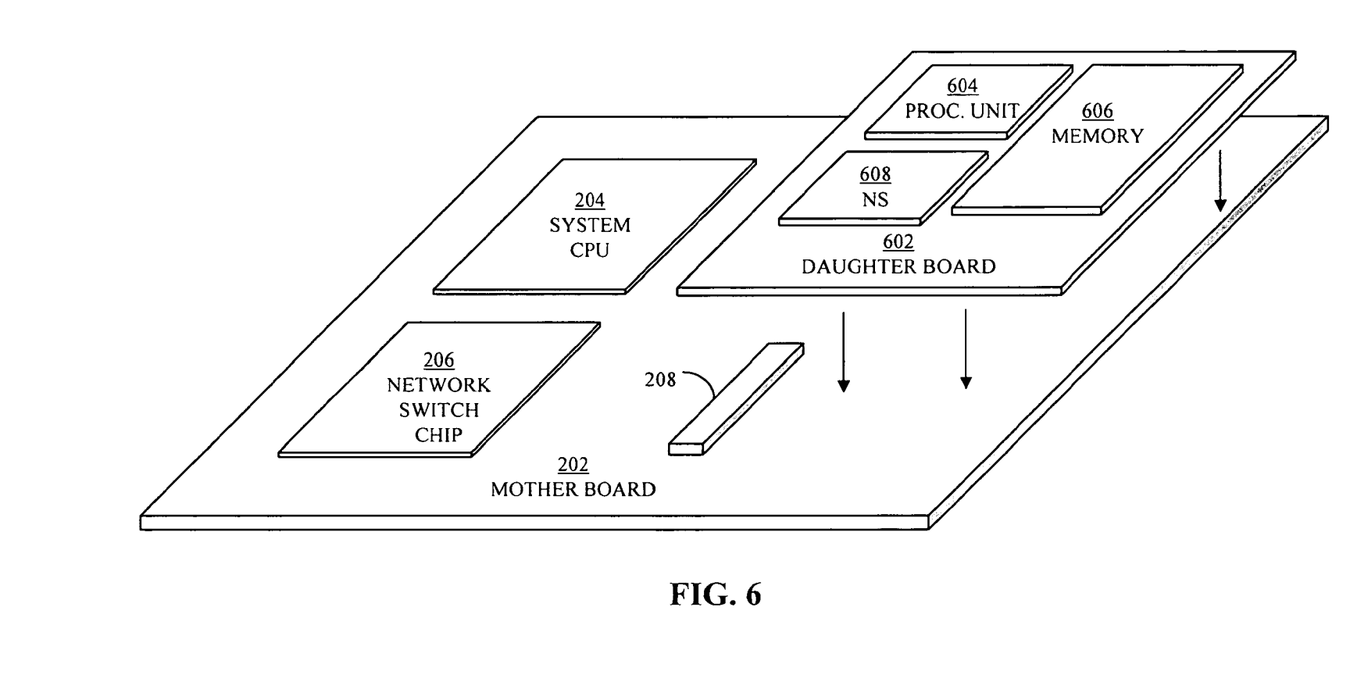
FIG. 6 illustrates an exemplary mother board and daughter board having a processor unit and a network switch of a packet switch appliance.

In embodiments depicted in FIGS. 2, 4, and 6, packet switch appliance 102 may include a mother board, which is the central or primary circuit board for the appliance. A number of system components may be found on mother board 202. System CPU (central processing unit) 204 interprets programming instructions and processes data, among other functions. Network switch chip 206, also referred to as an "ethernet switch chip" or a "switch-on-a-chip", provides packet switching and filtering capability in an integrated circuit chip or microchip design. Connector 208 provides mother board 202 with the capacity to removably accept peripheral devices or additional boards or cards. In one embodiment, connector 208 allows a device, such as a daughter or expansion board, to directly connect to the circuitry of mother board 202. Mother board 202 may also comprise numerous other components such as, but not limited to, volatile and non-volatile computer readable storage media, display processors, and additional peripheral connectors. The packet switch appliance may also be configured with one or more hardware ports or connectors for connecting servers, terminals, IP phones, network instruments, or other devices to the packet switch appliance.

Network switch chip 206 is provided with a plurality of ports and may also be provided with one or more filters. The ports may each be half-duplex or full-duplex. Each of the ports may be configured, either separately or in combination, as a network port, an instrument port, a transport port, or a loop-back port. Network ports are configured for connection to and/or from the network. Instrument ports are configured for connection to and/or from a network instrument, such as a packet sniffer, intrusion detection system, or the like. Transport ports are configured for connection to and/or from another network switch chip, another switch appliance, or a processor unit, as described below. Loop-back ports are configured to loop packets out of, and back into, the network switch chip.

Each loop-back port can be implemented using a single port. For example, an egress portion and an ingress portion can be separate paths in a single port. Alternatively, a loop-back port can be implemented using a pair of ports connected together. For example, an egress portion can correspond to a first port, and an ingress portion can correspond to a second port, which is separate from the first port but connected to the first port. The network switch appliance may include instructions stored on a computer readable medium for configuring single or dual port loop-back ports. The instructions may be executed on CPU 204. Each loop-back port reduces the number of ports available to be configured as a network, instrument, or transport port by at least one.

Each of the ports of network switch chip 206 may be associated with one or more packet filters that drop or forward a packet based on a criterion. For example, a loop-back port may be configured with an HTTP filter associated with its ingress portion which drops all HTTP packets.

C. Daughter Board Having a Network Switch

In an embodiment depicted in FIG. 2, daughter board 210 is configured to be removably connected to a mother board 202, via connector 208. Daughter board 210 is a secondary circuit board of variable configuration. The daughter board may be connected parallel to or in the same plane as the mother board, as shown. In the parallel configuration, the daughter board may also be referred to as a mezzanine board. Alternatively, the daughter board may be oriented perpendicularly to the plane of the mother board, or it may be connected in a differing orientation. Use of a daughter board may provide a number of advantages including, but not limited to, variable configuration of a basic design, ease and reduced cost of upgradeability, variability of the circuit board form factor, and scalability of packet switch appliance functionality.

Daughter board 210 of FIG. 2 includes a network switch chip 212, which may or may not be a network switch chip having the same design specification as network switch chip 206 residing on mother board 202. As with motherboard 202, daughter board 210 of FIG. 2 may also comprise numerous other components.

Typically, network switch chip 212 is an integrated circuit chip configured with a plurality of ports and one or more filters, as described above. Network switch chip 212 may provide the packet switch appliance with supplemental or expanded packet switching capabilities, including additional packet filtering capabilities. For example, one or more ports of network switch chip 212 may be configured as a loop-back port with an associated filter.

A first filter of network switch chip 212 may be associated with a first port of network switch chip 212. A second filter may be associated with the first port or a second port, and so forth. In the one embodiment, each of the filters is configured to only filter packets entering through the port associated with the filter. In alternative embodiments, the filters may also be configured as egress filters for filtering packets exiting through the port associated with the filter.

D. Packet Flow in Appliance with a Daughter Board Having a Network Switch

Figure 3:
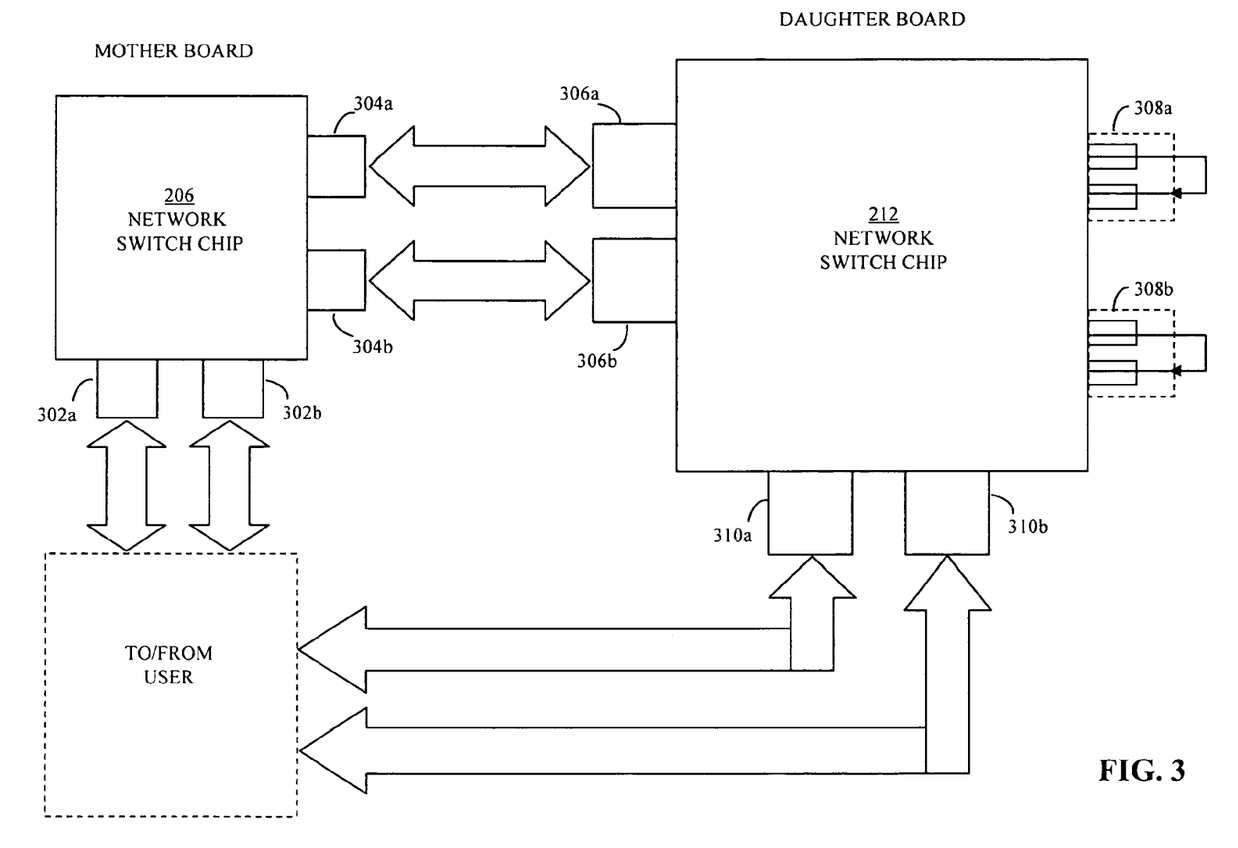
FIG. 3 illustrates an exemplary packet handling process in an exemplary packet switch appliance with a daughter board having a network switch.

FIG. 3 logically depicts an example of packet flow in a network switch appliance 102 having a mother board removably connected to a daughter board having a network switch.

In a first example, a packet is routed from an ingress port to an egress port, both on network switch chip 206. Assume that port 302a is a network port, that port 302b is an instrument port, and that the packet switch appliance is configured to route all packets from network port 302a to instrument port 302b. An ingress packet received at network port 302a is routed to instrument port 302b for egress by network switch chip 206.

In a second example, a packet is routed from an ingress port on network switch chip 206 to an egress port on network switch chip 212. Assume that port 302a is a network port, that port 310b is an instrument port, and that ports 304a, 304b, 306a, and 306b are transport ports. Further assume that the packet appliance is configured to route all packets from network port 302a to instrument port 310b. An ingress packet received at network port 302a is routed to transport port 304a for egress by network switch chip 206. The packet is received by network switch chip 212 at transport port 306a and routed to instrument port 310b for egress. In another embodiment, the packet is routed via transport ports 304b and 306b. Accordingly, packets received by the packet switch appliance may be routed either through one or more network switch chips based on the ingress and egress ports.

In a third example, packet traffic is routed from an ingress port to an egress port, both on network switch chip 206, with filtering via a loop-back port on network switch chip 212. Assume that port 302a is a network port, that port 302b is an instrument port, that ports 304a, 304b, 306a, and 306b are transport ports, and that port 308a is a loop-back port having an HTTP-only ingress filter. Further assume that the packet appliance is configured to route only HTTP packets from network port 302a to instrument port 302b. However, it is desirable to have network port 302a also forward all packets to ports other than instrument port 302b via one-to-many packet distribution and for instrument port 302b to receive all packets from ports other than network port 302a via many-to-one packet distribution. Accordingly, it is not possible to provide an HTTP-only ingress filter at network port 302a or an HTTP-only egress filter at instrument port 302b. Instead, loop-back port 308a is employed to perform the desired filtering. Ingress packet traffic comprising both HTTP and non-HTTP packets is received at network port 302a and routed to transport port 304a or 304b for egress by network switch chip 206. The packet traffic is received by network switch chip 212 at transport port 306a and routed to loop-back port 308a where non-HTTP packets are dropped by the HTTP-only ingress filter. The HTTP-only packet traffic is routed back to network switch chip 206 through transport port 306a and transport port 304a for egress at instrument port 302b.

It is understood that loop-back ports may be provided on either network switch chip 206 or network switch chip 212 and that more than one loop-back port may be employed to allow for cascade filtering. It is further understood that any combination of network ports, instrument ports, transport ports, and loop-back ports may be employed to provide a desired routing and/or filtering scheme using one or more network switch chips.

In an additional embodiment, network switch chip 206 and network switch chip 212 may be configured to operate on different Open Systems Interconnection Basic Reference Model (OSI) layers, up to the maximum OSI layer (Layer 7). For example, network switch chip 206 may be configured as a layer 2 switch while network switch 212 is configured to operate as a layer 3 or layer 4 switch or router.

E. Daughter Board with a Processor Unit

In another embodiment of the network switch appliance depicted in FIG. 4, daughter board 402 is configured to be removably connected to mother board 202. Daughter board 402 provides, in addition to packet distribution capabilities, packet processing capabilities. In a particular embodiment, daughter board 402 may be connected to mother board 202, after the removal of daughter board 210. Daughter board 402 is configured with a processor unit 404 and memory 406. As with motherboard 202, daughter board 402 of FIG. 4 may also comprise numerous other components.

Processor unit 404 may be any integrated circuit capable of routing and processing packets. Preferably, processor unit 404 may be, but is not limited to, an FPGA (field programmable gate array), NPU (network processor unit), multicore processor, multicore packet processor, or an ASIC (application specific integrated circuit) capable of routing packets, filtering packets, slicing packets, modifying packets, copying packets, or flow controlling packets. Processor unit 404 may function as a packet processor. Even more preferably, processor unit 404 is an integrated circuit having programmable logic blocks and programmable interconnects that is capable of packet processing. Processor unit 404 may include firmware having instructions for packet processing functions such as slicing, modifying, copying, or flow controlling packets. Processor unit 404 may process packets at line rate or at other than line rate.

Processor unit 404 may be configured with a plurality of connections, each of which may be configured, either separately or in combination, as a network connection, an instrument connection, or a transport connection. Network connections are configured for connection to and/or from the network. Instrument connections are configured for connection to and/or from a network instrument, such as a packet sniffer, intrusion detection system, or the like. Transport connections are configured for connection to and/or from a network switch chip network, another packet switch appliance, or another processor unit.

Memory 406 may be any computer readable storage medium or data storage device such as RAM or ROM. In one embodiment, processor unit 404 and memory 406 may be connected. In such an embodiment, processor unit 404 may contain firmware having computer programming instructions for buffering data packets on memory 406.

F. Packet Flow in Appliance with a Daughter Board Having a Processor Unit

Figure 5:
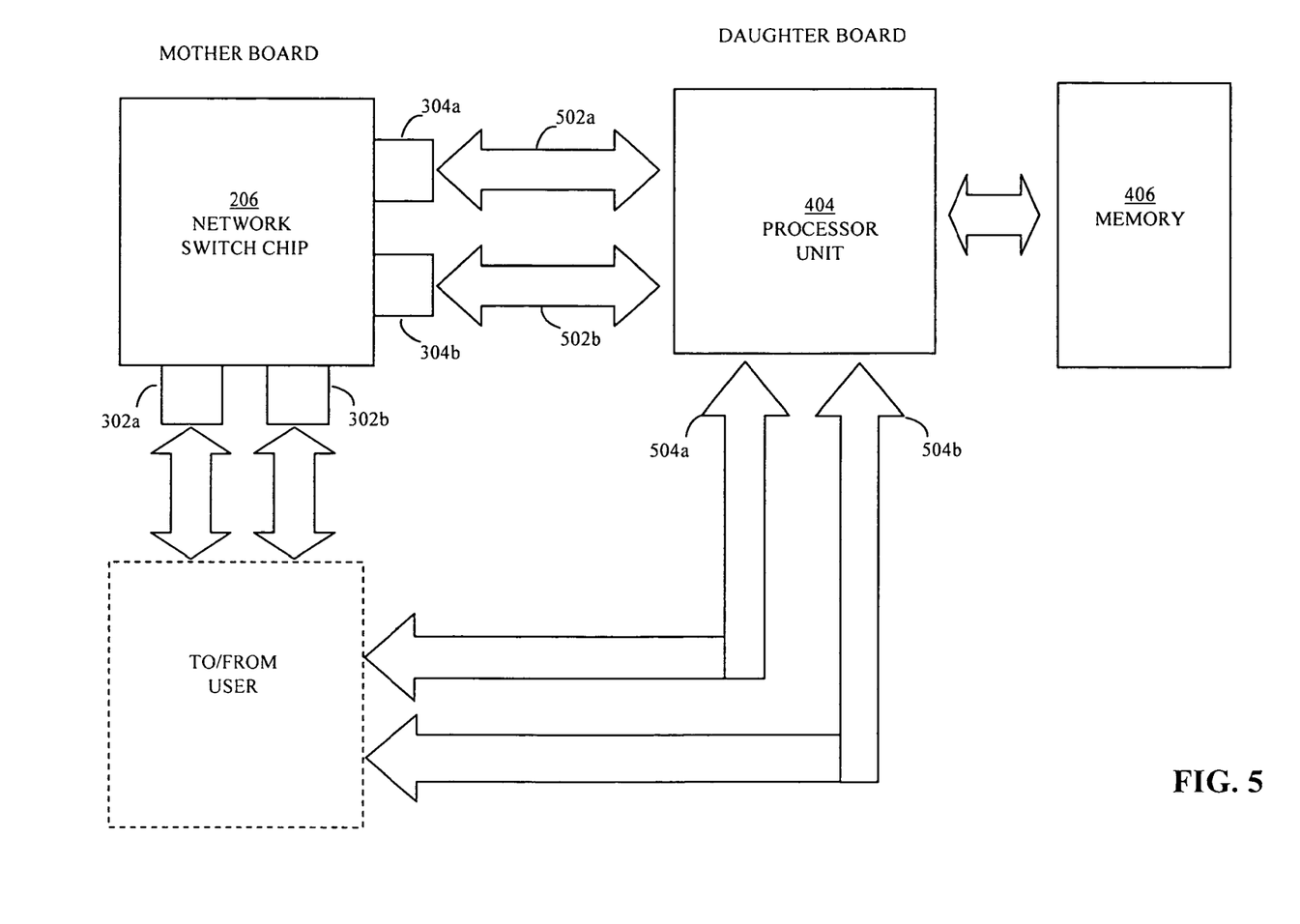
FIG. 5 illustrates an exemplary packet handling process in an exemplary packet switch appliance with a daughter board having a processor unit.

FIG. 5 logically depicts an example of packet flow in a network switch appliance 102 having a mother board removably connected to a daughter board having a processor unit.

In a first example, a packet is routed from an ingress network connection to an egress instrument connection, both connected to processor unit 404. Assume that connection 504a is a network connection, that connection 504b is an instrument connection, and that the packet switch appliance is configured to route all packets from network connection 504a to instrument connection 504b. An ingress packet received at network connection 504a is routed to instrument connection 504b by processor unit 404.

In a second example, a packet is routed from an ingress port on network switch chip 206 to an instrument connection of processor unit 404. Assume that port 302a is a network port on network switch chip 206, that ports 304a and 304b are transport ports on network switch chip 206, that connections 502a and 502b are transport connections between network switch chip 206 and processor unit 404, and that connection 504b is an instrument connection. Further assume that the packet switch appliance is configured to route all packets from network port 302a to instrument connection 504b. An ingress packet received at network port 302a is routed to transport port 304a or 304b for egress by network switch chip 206. The packet is received by processor unit 404 via connection 502a or 502b and routed to instrument connection 504b for egress. Accordingly, packets received by the packet switch appliance may be routed either through a network switch chip, a processor unit, or a combination of a network switch chip and a processor unit, based on the ingress and egress ports or connections.

In a third example, a packet is routed from an ingress port to an egress port, both on network switch chip 206, with time stamping. Assume that port 302a is a network port on network switch chip 206, that port 302b is an instrument port on network switch chip 206, that ports 304a and 304b are transport ports on network switch chip 206, and that connections 502a and 502b are connections between network switch chip 206 and processor unit 404. Further assume that the packet switch appliance is configured to route all packets from network port 302a to instrument port 302b, after time stamping each packet. An ingress packet received at network port 302a is routed to transport port 304a for egress by network switch chip 206. The packet is received by processor unit 404 via connection 502a and time stamped. In another embodiment, the ingress packet is routed via transport port 304b and received at connection 502b. The time stamped packet is routed back to network switch chip 206 through connections 502a and transport ports 304a for egress at instrument port 302b.

G. Daughter Board with Network Switch Chip and Processor Unit

In another embodiment of the network switch appliance depicted in FIG. 6, daughter board 602 is configured to be removably connected to mother board 202. In a particular embodiment, daughter board 602 is connected to mother board 202 after the removal of daughter board 210 or daughter board 402. Daughter board 602 is configured with a processor unit 604, memory 606, and network switch chip 608, each of which may be configured as described above. Daughter board 602 provides, in addition to packet distribution capabilities, packet processing capabilities. Processor unit 604 may be connected with memory 606 and network switch chip 608. Daughter board 602 may also comprise numerous other components and may be oriented relative to motherboard 202, as described for daughter board 210.

H. Packet Flow in Appliance with a Daughter Board Having a Processor Unit and a Network Switch Chip FIG. 7 logically depicts an example of packet flow in a network switch appliance 102 having a mother board removably connected to a daughter board having a processor unit and a network switch chip.

Figure 7:
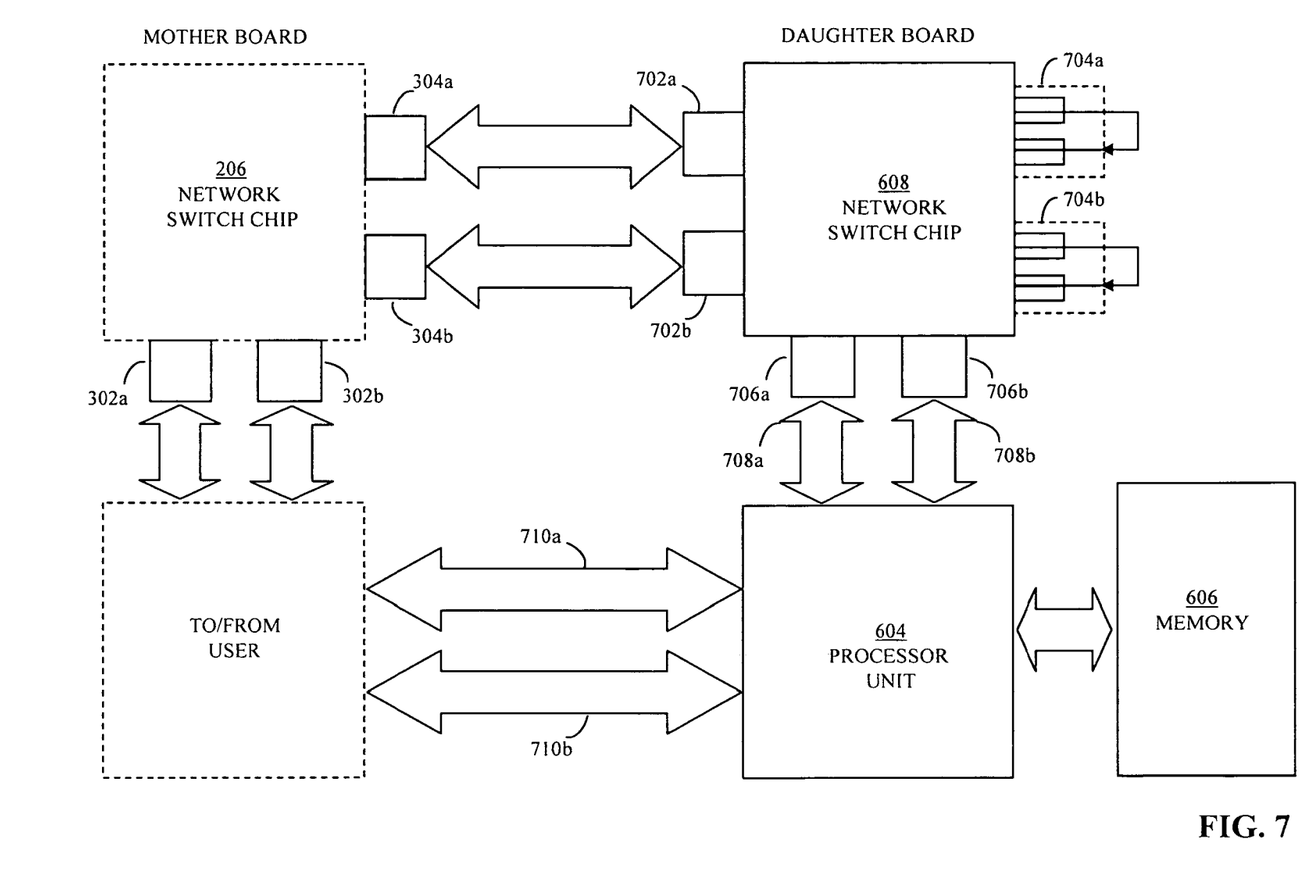
FIG. 7 illustrates an exemplary packet handling process in an exemplary packet switch appliance with a daughter board having a processor unit and a network switch.

In a first example, a packet is routed from an ingress port on network switch chip 206 to an egress connection of processor unit 604. Assume that port 302a is a network port on network switch chip 206, that ports 304a, 304b, 702a, 702b, 706a, and 706b are transport ports, that connections 708a and 708b are transport connections between network switch chip 608 and processor 604, and that connection 710b is an instrument connection of processor unit 604. Further assume that the packet switch appliance is configured to route all packets from network port 302a to instrument connection 710b. An ingress packet received at network port 302a is routed to transport port 304a or 304b for egress by network switch chip 206. The packet is received by network switch chip 608 at transport port 702a and routed to transport port 706a for egress. The packet is subsequently received by processor unit 604 via connection 708a and routed to instrument connection 710b for egress. Accordingly, packets received by the packet switch appliance may be routed either through a network switch chip, a processor unit, or a combination of one or more network switch chips and processor units, based on the ingress and egress ports or connections.

In a second example, packet traffic is routed from an ingress port to an egress port, both on network switch chip 206, with HTTP-only filtering and time stamping. Assume that port 302a is a network port, that port 302b is an instrument port, that ports 304a, 304b, 702a, 702b, 706a, and 706b are transport ports, that connections 708a and 708b are transport connections between network switch chip 608 and processor 604, and that port 704a is a loop-back port having an HTTP-only ingress filter. Further assume that the packet appliance is configured to route only HTTP packets from network port 302a to instrument port 302b. However, it is desirable to have network port 302a also forward all packets to ports other than 302b via one-to-many packet distribution and for instrument port 302b to receive all packets from ports other than network port 302a via many-to-one packet distribution. Ingress packet traffic comprising both HTTP and non-HTTP packets is received at network port 302a and routed to transport port 304a or 304b for egress by network switch chip 206. The packet is received by network switch chip 608 at transport port 702a and routed to loop-back port 704a where non-HTTP packets are dropped by the HTTP-only ingress filter. The HTTP-only packet traffic is routed to transport port 706a for egress. The packet traffic is subsequently received by processor unit 604 via transport connection 708a and time stamped. The HTTP-only, time stamped packet traffic is routed back to network switch chip 608 and subsequently to network switch chip 206 for egress at instrument port 302b.

It is understood that network switch chip 206, network switch chip 608, and processor unit 604 may be variably configured such that packet traffic may pass through only one, some, or all of network switch chip 206, network switch chip 608, or processor unit 604, in any permutation. It is further understood that any combination of network, instrument, and transport ports or connections, with or without loop-back ports, may be employed to provide a desired routing or other packet handling scheme in combination with one or more network switch chips, processor units, or a combination of a network switch chips and processor units.

We claim:

1. A packet switch appliance, comprising:
a first network port configured to receive a packet from a network;
a first instrument port configured to communicate with a network monitoring instrument; and
a processing unit communicatively coupled to the first network port and the first instrument port, wherein the processing unit comprises:
a first circuit board having a connector, and a first circuit configured to perform a first packet processing, and a second circuit board configured to be detachably connected to the first circuit board through the connector on the first circuit board, the second circuit board having a second circuit configured to perform a second packet processing, wherein the second circuit board is configured to communicate with the first circuit board, and comprises at least two ports with different respective packet processing rules associated therewith.

2. The packet switch appliance of claim 1, further comprising a third circuit board configured to perform a third packet processing.

3. The packet switch appliance of claim 1, wherein the second circuit at the second circuit board comprises a processor.

4. The packet switch appliance of claim 3, wherein the processor comprises a FPGA, a network processor unit, a multicore processor, a multicore packet processor, or an ASIC.

5. The packet switch appliance of claim 1, wherein the first circuit board comprises multiple processing modules configured to perform different respective packet processing functions.

6. The packet switch appliance of claim 1, wherein the second circuit is configured to perform packet slicing, packet modification, packet copying, or packet flow control, as the second packet processing.

7. The packet switch appliance of claim 1, wherein the second circuit board comprises a first filter associated with the first network port.

8. The packet switch appliance of claim 7, further comprising a second network port, wherein the second circuit board comprises a second filter associated with the second network port.

9. The packet switch appliance of claim 1, wherein the first packet processing comprises a first packet filtering, and the second packet processing comprises a second packet filtering.

10. The packet switch appliance of claim 1, wherein the second packet processing comprises packet modification based on header information.

11. The packet switch appliance of claim 1, further comprising a communication port configured to communicate with another packet switch appliance.

12. The packet switch appliance of claim 11, wherein at least a portion of the packet switch appliance and at least a portion of the other packet switch appliance have a same hardware architecture.

13. The packet switch appliance of claim 12, wherein the packet switch appliance and the other packet switch appliance have respective network switch chips with a same design specification.

14. The packet switch appliance of claim 1, wherein the first packet processing comprises packet distribution.

15. The packet switch appliance of claim 1, further comprising a second network port, and a second instrument port, wherein the first packet processing or the second packet processing comprises performing packet transmission from one or more of the first and second network ports to one or more of the first and second instrument ports.

16. The packet switch appliance of claim 15, wherein the packet transmission comprises passing packets from one of the network ports to one of the instrument ports in a one-to-one configuration.

17. The packet switch appliance of claim 15, wherein the packet transmission comprises passing packets from one of the network ports to both the first and second instrument ports in a one-to-many configuration.

18. The packet switch appliance of claim 15, wherein the packet transmission comprises passing packets from both the first and second network ports to one of the first and second instrument ports in a many-to-one configuration.

19. The packet switch appliance of claim 15, wherein the packet transmission comprises passing packets from the first and second network ports to the first and second instrument ports in a many-to-many configuration.

20. The packet switch appliance of claim 1, wherein the packet is transmitted from a first node for reception by a second node, and the processing unit is configured to pass the packet to the first instrument port for transmission of the packet to the network monitoring instrument at a location that is different from a location of the second node.

21. The packet switch appliance of claim 1, wherein the processing unit is configured to remove information from the packet, and the second circuit board is configured to perform packet filtering as the second packet processing.

22. The packet switch appliance of claim 1, wherein the packet switch appliance is an out-of-band device by not participating in a transmission of the packet to an original intended recipient of the packet.

23. The packet switch appliance of claim 1, wherein the at least two ports comprises a first port with a first filter associated therewith, and a second port with a second filter associated therewith, the first filter being different from the second filter.

24. The packet switch appliance of claim 23, wherein the first port comprises a first transport port for communication with the first circuit board.

25. The packet switch appliance of claim 24, wherein the second port comprises a second transport port for communication with the first circuit board.

26. The packet switch appliance of claim 1, wherein the packet is transmitted from a first node for reception by an originally intended recipient, and the processing unit is configured to pass the packet to the first instrument port for transmission of the packet to another recipient that is different from the originally intended recipient.

27. A packet switch system, comprising:
a first packet switch appliance comprising a first network port for receiving a packet from a network; and
a second packet switch appliance communicatively coupled to the first packet switch appliance, and is configured to receive the packet from the first packet switch appliance;
wherein the second packet switch appliance comprises a first instrument port configured to communicate with a network monitoring instrument, and a processing unit coupled to the first instrument port, wherein the processing unit comprises:
a first circuit board having a first circuit configured to perform a first packet processing, and
a second circuit board configured to be detachably connected to the first circuit board, the second circuit board having a second circuit configured to perform a second packet processing.

28. The packet switch system of claim 27, wherein the second packet switch appliance further comprises a third circuit board configured to perform a third packet processing.

29. The packet switch system of claim 27, wherein the second circuit at the second circuit board comprises a processor.

30. The packet switch system of claim 29, wherein the processor comprises a FPGA, a network processor unit, a multicore processor, a multicore packet processor, or an ASIC.

31. The packet switch system of claim 27, wherein the second circuit board comprises multiple processing modules configured to perform different respective packet processing functions.

32. The packet switch system of claim 27, wherein the second circuit board is configured to perform packet slicing, packet modification, packet copying, or packet flow control.

33. The packet switch system of claim 27, wherein the second circuit board comprises a first filter associated with a first port.

34. The packet switch system of claim 33, wherein the second circuit board comprises a second filter associated with a second port.

35. The packet switch system of claim 27, wherein the first packet processing comprises a first packet filtering, and the second packet processing comprises a second packet filtering.

36. The packet switch system of claim 27, wherein the second packet processing comprises packet modification based on header information.

37. The packet switch system of claim 27, wherein the second packet switch appliance comprises a communication port configured to communicate with the first packet switch appliance.

38. The packet switch system of claim 27, wherein the first packet processing comprises packet distribution.

39. The packet switch system of claim 27, wherein the second switch appliance comprises a second instrument port, wherein the first packet processing or the second packet processing comprises performing packet transmission to one or more of the first and second instrument ports.

40. The packet switch system of claim 39, wherein the packet transmission comprises passing packets to one of the instrument ports in a one-to-one configuration.

41. The packet switch system of claim 39, wherein the packet transmission comprises passing packets to both the first and the second instrument ports in a one-to-many configuration.

42. The packet switch system of claim 39, wherein the packet transmission comprises passing packets to one of the first and second instrument ports in a many-to-one configuration.

43. The packet switch system of claim 39, wherein the packet transmission comprises passing packets to the first and second instrument ports in a many-to-many configuration.

44. The packet switch system of claim 27, wherein the packet is transmitted from a first node for reception by a second node, and the processing unit is configured to pass the packet to the first instrument port for transmission of the packet to the network monitoring instrument at a location that is different from a location of the second node.

45. The packet switch system of claim 27, wherein the processing unit is configured to remove information from the packet, and the second circuit board is configured to perform packet filtering as the second packet processing.

46. The packet switch system of claim 27, wherein at least a portion of the first packet switch appliance and at least a portion of the second packet switch appliance have a same hardware architecture.

47. The packet switch system of claim 46, wherein the first packet switch appliance and the second packet switch appliance have respective network switch chips with a same design specification.

48. The packet switch system of claim 27, wherein the packet is transmitted from a first node for reception by an originally intended recipient, and the processing unit is configured to pass the packet to the first instrument port for transmission of the packet to another recipient that is different from the originally intended recipient.

* * * * *